(12) United States Patent
Portell et al.

(10) Patent No.: US 7,350,633 B2
(45) Date of Patent: Apr. 1, 2008

(54) APPLY PISTON FOR A POWER TRANSMISSION

(75) Inventors: Patrick S. Portell, Pinckney, MI (US); Teodor Mostior, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 280 days.

(21) Appl. No.: 11/143,224

(22) Filed: Jun. 2, 2005

(65) Prior Publication Data

US 2006/0016660 A1   Jan. 26, 2006

Related U.S. Application Data

(60) Provisional application No. 60/589,277, filed on Jul. 20, 2004.

(51) Int. Cl.
*F16D 25/0638* (2006.01)

(52) U.S. Cl. ................ 192/85 AA; 475/146; 188/71.5; 188/72.4

(58) Field of Classification Search ........... 192/85 AA; 475/146
See application file for complete search history.

(56) References Cited

U.S. PATENT DOCUMENTS

| | | | | |
|---|---|---|---|---|
| 2,925,159 A * | 2/1960 | Black | .................... | 192/85 AA |
| 3,747,730 A * | 7/1973 | Hause | .................... | 192/87.11 |
| 3,994,378 A * | 11/1976 | Schwabe et al. | ......... | 192/70.28 |
| 5,579,883 A | 12/1996 | Tsukamoto et al. | ...... | 192/87.15 |
| 6,227,340 B1 * | 5/2001 | Braford, Jr. | ................ | 192/48.7 |

FOREIGN PATENT DOCUMENTS

JP            57015150 A  *   1/1982

* cited by examiner

*Primary Examiner*—Richard M Lorence

(57) ABSTRACT

An apply piston for a torque-transmitting mechanism in a power transmission includes a first circumferential periphery and a second circumferential periphery radially inward of the first circumferential periphery and axially displaced therefrom. The apply piston has a generally radially-extending face between the two peripheries. The two peripheries and the radially-extending face cooperate with a transmission case to form a fluid-filled chamber that is selectively expandable to direct fluid force to the piston for engagement of the torque-transmitting mechanism.

10 Claims, 2 Drawing Sheets

APPLY PISTON FOR A POWER TRANSMISSION

CROSS-REFERENCE TO RELATED APPLICATIONS

This application claims the benefit of U.S. Provisional Application No. 60/589,277, filed Jul. 20, 2004, which is hereby incorporated by reference in its entirety.

TECHNICAL FIELD

This invention relates to engagement of apply pistons in power transmissions and, more particularly, to pistons that are evenly slidingly disposed within a transmission case.

BACKGROUND OF THE INVENTION

Many power transmissions employ stationary torque-transmitting mechanisms, commonly termed brakes or reaction clutches in which the hydraulic apply piston is slidably engaged within a cavity formed in the transmission case. In some instances, the piston is slidably disposed in the transmission case and cooperates therewith to form an apply cavity or chamber. In these designs, the piston is accompanied with a seal member, which sealingly engages the transmission case, and the case is supplied with a seal member, which engages sealingly with a diameter formed on the piston. In such arrangements, it is necessary to machine finish both the case and the piston since the sealing surface must be smooth and relatively or substantially free of tool marks, which cause excess seal wear.

SUMMARY OF THE INVENTION

The present invention provides an improved apply piston of a power transmission having seal members disposed within the piston.

A power transmission has a transmission case and a torque-transmitting mechanism and further includes an apply piston movable for selectively engaging the torque-transmitting mechanism. The apply piston is characterized by a first circumferential outer periphery, and a second circumferential outer periphery radially inward of the first circumferential outer periphery and axially displaced therefrom. A generally radially-extending face is formed between the first and second outer peripheries. Preferably, the apply piston is cast, having no machined surfaces. The first and second circumferential outer peripheries and the generally radially-extending face are adapted to cooperate with the transmission case to form a selectively expandable fluid-filled chamber configured for directing fluid force to the piston for engagement of the torque-transmitting mechanism when the chamber expands.

In one aspect of the invention, the power transmission includes an annular seal and the apply piston is formed with an annular groove in at least one of the first and second outer peripheries. The annular seal is seatable within the annular groove for sealing engagement with the transmission case. Preferably, an annular groove is provided on each of the first and second outer peripheries with an annular seal seated in each annular groove.

In yet another aspect of the invention, the power transmission includes a spring that biases the apply piston in one direction and is deflectable upon movement of the piston. The apply piston is formed with at least one recess configured to receive the spring. Preferably, the apply piston is formed with a plurality of circumferentially-spaced recesses.

Also preferably, a spring retainer is connectable to the transmission case and retains the spring between the apply piston and the case.

In yet another aspect of the invention, the apply piston is formed with an orifice that vents entrained air from the fluid-filled chamber.

In another aspect of the invention, the transmission case has first and second surfaces, preferably inner peripheral surfaces, that are machined, with a generally radially-extending case face therebetween to form a case profile. The first and second outer peripheries of the apply piston and the generally radially-extending face form an apply piston profile that is configured for providing contact with the case profile to define the expandable fluid-filled chamber therebetween. Because the apply piston uses annular seals only at the outer periphery rather than the inner periphery, assembly is simplified as outer peripheral seals are more easily seated in a stretch to fit manner not available with inner peripheral seals. Additionally, because only inner peripheral surfaces of the case need to be machined rather than an entire cavity within the case, machining is simpler and may be performed concurrently with other assembly operations.

A method of forming a transmission includes casting a transmission case having the first inner periphery, the second inner periphery axially displaced from the first inner periphery and the radially extending case face therebetween. The method further includes machining the first inner periphery and machining the second inner periphery. The method further includes casting an apply piston having the first outer periphery, the second outer periphery axially displaced from the first outer periphery and the radially-extending piston face between the first and second outer peripheries. The method also includes positioning the apply piston adjacent to the transmission case such that the first and second outer peripheries generally slidingly abut the respective first and second inner peripheries of the case.

In one aspect of the invention, an annular groove is formed in one or both of the first and second outer peripheries of the apply piston during the casting step. The method may further include placing an annular seal within the annular groove for sealing engagement between the respective outer periphery and the transmission case.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
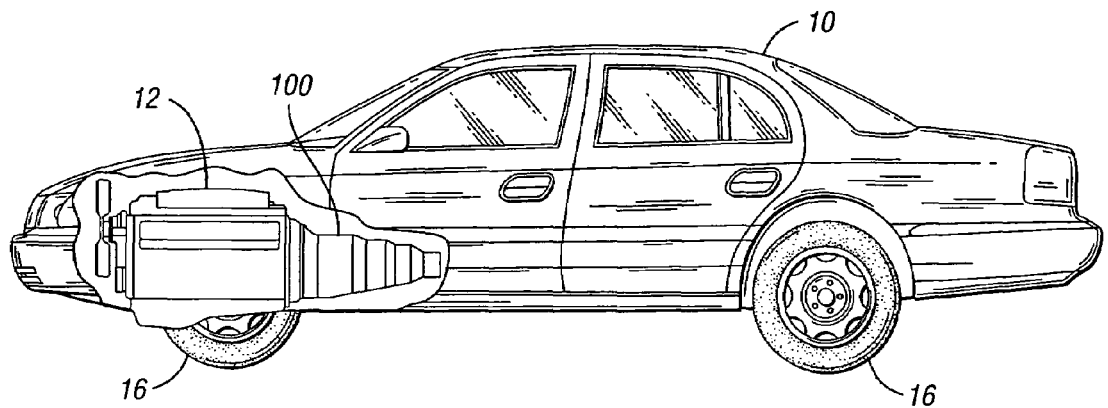
FIG. 1 is a schematic side-view illustration in partial fragmentary view of a vehicle having an engine and a transmission.

Referring to the drawings, wherein like reference numbers refer to like components, as seen in FIG. 1, a vehicle 10 includes a power source 12, such as an engine which transmits power through a transmission 100 at varying speed ratios for turning wheels 16 to propel the vehicle 10, as is readily understood by those skilled in the art.

Figure 2:
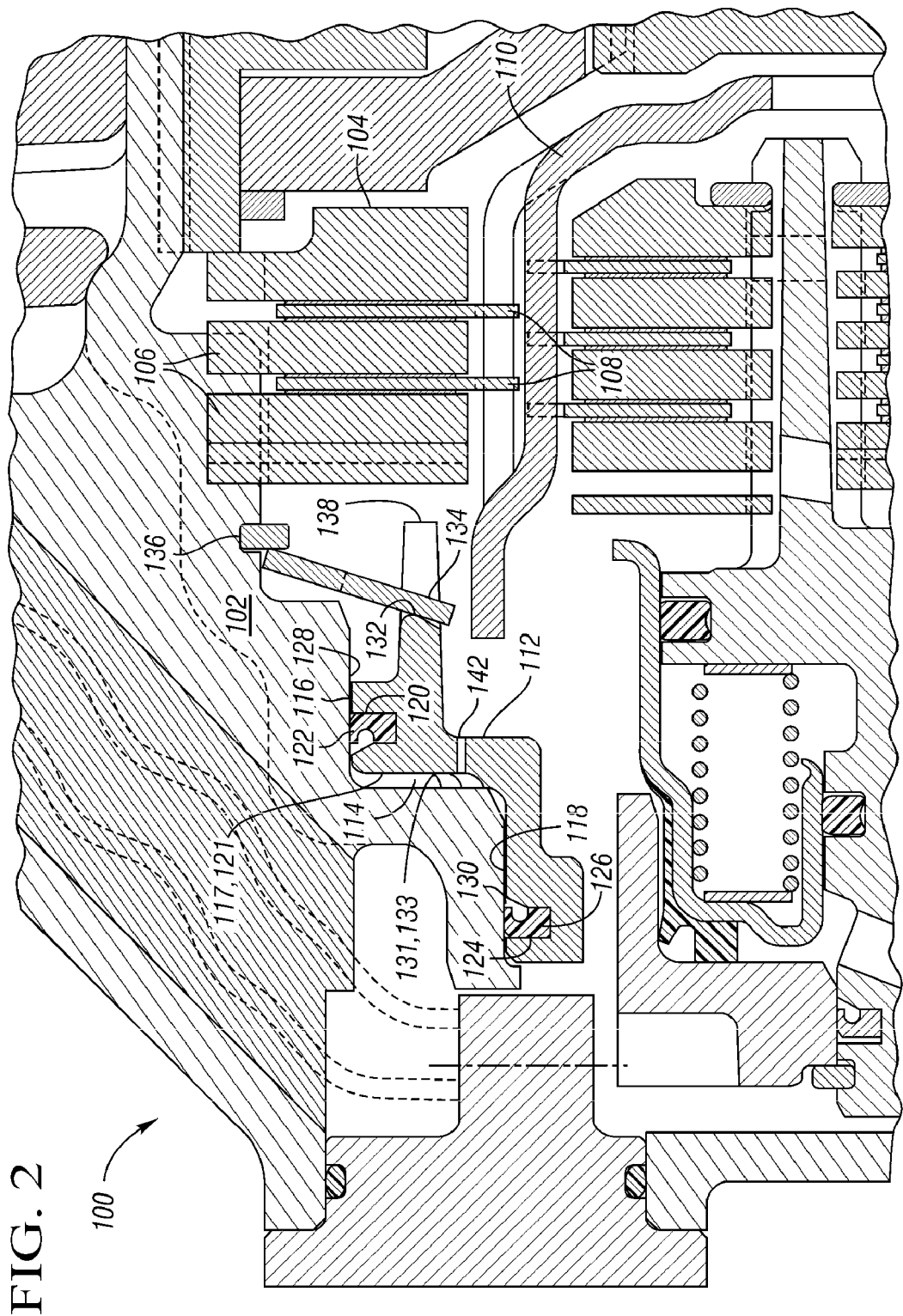
FIG. 2 is a schematic illustration in fragmentary cross-sectional view of a portion of the transmission of FIG. 1 including an apply piston.

Referring to FIG. 2, the transmission 100 includes a transmission case 102 that at least partially encloses transmission components such as rotatable gears and torque-transmitting mechanisms (such as torque-transmitting mechanism 104) which are typically selectively engageable to act as clutches, connecting transmission components such as gears with one another or with an input or output shaft, or to act as brakes by grounding a rotatable transmission component such as a hub or a gear to a stationary member, such as the transmission case 102. The torque-transmitting mechanism 104 is a brake and includes a plurality of friction plates 106, which are splined to the transmission case 102 and a plurality of friction plates 108, which are splined to the outer spline of a hub member 110. An apply piston 112 is disposed within the transmission case 102 and cooperates therewith to form an apply chamber 114.

The piston 112 is formed with a first cylindrical outer periphery or surface 116 and a second cylindrical outer periphery or surface 118, which extends inward of the first cylindrical outer periphery 116 and is axially displaced therefrom. A generally radially-extending face 117 is formed between the first and second cylindrical outer peripheries 116, 118, to create a substantially Z-shaped outer profile 121 of the piston 112 (the outer profile 121 being defined by the piston surfaces at the first and second outer peripheries 116, 118 and by the radially extending face 117 therebetween).

The outer periphery 116 has formed therein a first groove 120 in which is radially disposed a first annular lip seal 122. The second cylindrical outer periphery 118 includes a second groove 124 in which is disposed a second annular lip seal 126. The first annular lip seal 122 sealingly engages a first machined inner periphery or surface 128 formed on the transmission case 102 and the second annular lip seal 126 sealingly engages a second machined inner periphery or surface 130 formed on the transmission case 102. A generally radially-extending face 131 of the case 102 is formed between the first and second machined surfaces 128, 130 to create a complementary substantially Z-shaped profile 133 of the case 102 that cooperates with the seals 122, 126 and the substantially Z-shaped outer profile 121 of the piston 112 to form the apply chamber 114. The substantially Z-shaped profile 133 of the case 102 includes the first and second machined surface and the generally radially-extending face 131.

Because both the first and second lip seals 122, 126 are "external" seals (i.e., they are disposed on a radially outer periphery of the apply piston 112), they may stretch to adequately seat within the grooves 120, 124. By contrast, typical apply pistons engaged within a cavity formed within the transmission case require an internal seal as well as an external seal (an internal seal being a seal held within a groove formed on a radially inward portion of the apply piston). Internal seals are more difficult to assemble with the apply piston as they do not simply stretch to fit therewith.

The first and second outer peripheries 116, 118 of the piston 112 do not sealingly engage the surfaces 128 and 130, respectively (the respective lip seals 122, 126 perform this function instead). With modern machine tools that are employed to machining transmission cases, it is a relatively easy matter to machine both the surfaces 128 and 130 while other machining and operations are being concurrently conducted on the transmission case, which may present a reduction in assembly time translating to a potential cost advantage.

The stack tolerances generally associated with sealing pistons are somewhat reduced with design of the present piston 112 and seals 122, 126. In a traditional apply piston slidingly engaged with a cavity formed in the transmission case, the variation in machined diameter of the piston and the variation in bore diameter of the cavity in the case stack together (because the piston and bore are juxtaposed) to cause an increased variation in fit of the cavity and piston with one another. With the present invention, the fit or tolerances between the first cylindrical outer periphery 116 and the first machined surface 128 and the second cylindrical outer periphery 118 and the second machined surface 130 do not necessarily stack together. Due to the respective Z-shaped profiles 133, 121 of the case 102 and the piston 112, dimensional variations between the first machined surface 128 and the first outer periphery 116 and between the second machine surface 130 and the second outer periphery 118 may potentially "cancel" one another out, as the relative fit between the first machined surface 128 and the first outer periphery 116 is affected by the relative fit between the second machined surface 130 and the second outer periphery 118 or vice versa. Moreover, it is more difficult to machine a cavity (i.e., a three-dimensional recess) within the transmission case than it is to machine the first and second machined surfaces 128, 130, respectively.

Figure 3:
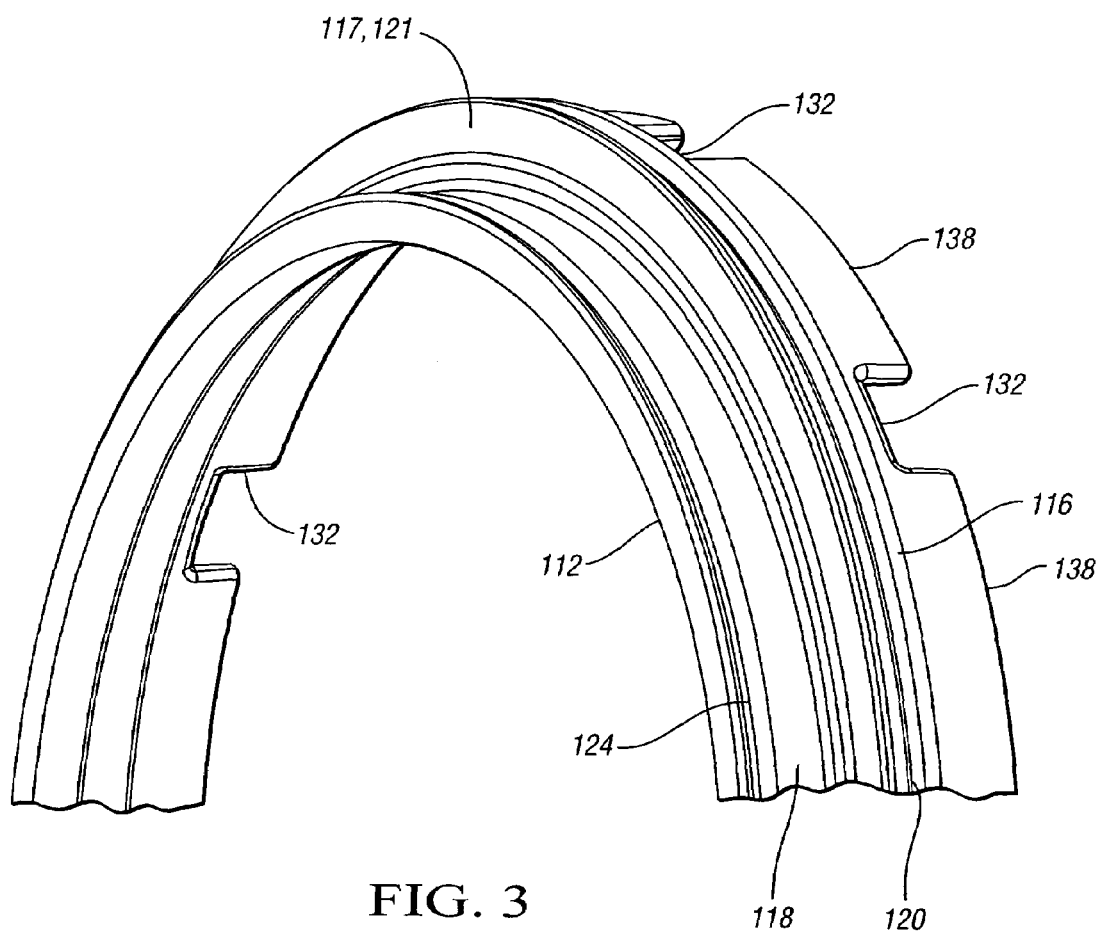
FIG. 3 is a schematic illustration in fragmentary perspective view of a portion of the apply piston shown in FIG. 2.

The piston 112 has a plurality of recesses 132 formed thereon (which may be better viewed in FIG. 3). These recesses 132 provide engagement surfaces for a wave or Belleville spring 134 (shown in FIG. 2), which is positioned in the transmission case 102 by a spring retainer such as a locking or locating ring 136. The spring 134 forces the piston 112 into the transmission case 102 (in a direction toward the radial face 131 of the case) to provide minimum volume within the chamber 114.

Intermediate the recesses 132 is a plurality of apply surfaces 138, adapted to abut the plates 106 to enforce frictional engagement between the plates 106 and 108 when fluid force in the expandable fluid-filled apply chamber 114 moves the piston 112 in a direction away from the radial face 131 of the case, thereby engaging the torque-transmitting mechanism 104 to provide a torque-transmitting relationship between a rotatable member such as a sun gear (not shown; attached to the hub member 110) and the transmission case 102 to hold the rotatable member stationary during one or more forward ratios of the transmission 100.

The piston 112 is formed with a small air bleed orifice 142, which allows air entrained in the fluid-filled chamber 114 to vent from the chamber 114 to prevent air from accumulating within the chamber 114. This improves the engagement time and quality of the torque-transmitting mechanism 104.

The structure described provides an improved transmission assembly with an apply piston member that is employed in the "as cast" condition (i.e., does not require machining), has seal members disposed therein, and permits all required finishing to be performed within the transmission case.

While the best mode for carrying out the invention has been described in detail, those familiar with the art to which this invention relates will recognize various alternative designs and embodiments for practicing the invention within the scope of the appended claims.

The invention claimed is:

1. A power transmission having a transmission case and a torque-transmitting mechanism and comprising;

a generally annular apply piston movable for selectively engaging the torque-transmitting mechanism, wherein said apply piston is characterized by a first circumferential outer periphery, a second circumferential outer periphery radially inward of the first circumferential outer periphery and axially displaced therefrom, and a generally radially-extending face between said first and second outer peripheries; wherein said apply piston is formed with a first annular groove in said first outer periphery and a second annular groove in said second outer periphery;

a first annular seal seatable within said first annular groove for sealing engagement with the transmission case;

a second annular seal seatable within said second annular groove for sealing engagement with the transmission case;

wherein said first and second circumferential outer peripheries and said generally radially-extending face are adapted for cooperation with the transmission case to form a selectively expandable fluid-filled chamber configured for directing fluid force to said piston for engagement of the torque-transmitting mechanism when said chamber expands;

wherein said first and second annular seals are in sliding contact with said transmission case as said chamber expands; and wherein said apply piston is characterized by an absence of any additional seals seated therein and by an absence of any additional surfaces in contact with the transmission case or with any other stationary component as the chamber expands.

2. The power transmission of claim 1; further comprising:

a spring for biasing said apply piston in one direction and deflectable upon movement of said piston;

wherein said apply piston is formed with at least one recess configured to receive said spring.

3. The power transmission of claim 2, wherein said at least one recess includes a plurality of circumferentially-spaced recesses.

4. The power transmission of claim 2, further comprising:

a spring retainer connectable to the transmission case and operable for retaining the spring between said apply piston and the transmission case.

5. The power transmission of claim 1, wherein said apply piston is formed with an orifice operable for venting entrained air from said fluid-filled chamber.

6. A power transmission including a rotatable member and comprising:

a transmission case having first and second surfaces machined therein with a generally radially-extending case face therebetween to form a case profile;

a torque-transmitting mechanism disposed in said transmission case and selectively engageable for connecting the rotatable member with said transmission case for preventing rotation of the rotatable member;

an apply piston moveable for selectively engaging said torque-transmitting mechanism, wherein said apply piston is characterized by a first circumferential outer periphery, a second circumferential outer periphery radially inward of said first circumferential outer periphery and axially displaced therefrom, and a generally radially-extending piston face between said first and second outer peripheries to form an apply piston profile;

wherein said apply piston is formed with a first annular groove in said first outer periphery and a second annular groove in said second outer periphery;

a first annular seal seatable within said first annular groove for sealing engagement with the transmission case;

a second annular seal seatable within said second annular groove for sealing engagement with the transmission case;

wherein said first and second annular seals and said first and second machined surfaces, respectively, are configured for sliding contact with one another to define an expandable fluid-filled chamber therebetween configured for directing fluid force to move said piston to engage said torque-transmitting mechanism; and wherein said apply piston is characterized by an absence of any additional seals seated thereon and an absence of any additional surfaces that are in sliding contact with the transmission case or with any other stationary component as the chamber expands.

7. The power transmission of claim 6, further comprising:

a spring for biasing said apply piston in one direction and deflectable in an opposing direction upon movement of said apply piston; and wherein said apply piston is formed with at least on recess, said spring being recessed within said at least one recess.

8. The power transmission of claim 6, further comprising:

a spring retainer connected to said transmission case and operable for retaining said spring between said apply piston and said transmission case.

9. The power transmission of claim 6, wherein said apply piston is formed with an orifice operable for venting entrained air from said fluid-filled chamber.

10. The power transmission of claim 6, wherein said apply piston is cast and is characterized by an absence of machined surfaces.

* * * * *